(12) United States Patent
Shiba et al.

(10) Patent No.: US 6,978,685 B2
(45) Date of Patent: Dec. 27, 2005

(54) STEERING STATE DETECTING APPARATUS (75) Inventors: Mahito Shiba, Osaka (JP); Naoki Maeda, Nara (JP); Yoshitomo Tokumoto, Mie (JP); Kenichi Kotaka, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/668,602

(22) Filed: Sep. 24, 2003

(65) Prior Publication Data

US 2004/0117145 A1 Jun. 17, 2004

(30) Foreign Application Priority Data

Sep. 25, 2002 (JP) .................................. P. 2002-279436

(51) Int. Cl.$^7$ ................................................ G01L 3/02
(52) U.S. Cl. ................................................ 73/862.334
(58) Field of Search ................ 73/862.328, 862.329, 73/862.331, 862.333, 862.334, 862.193

(56) References Cited

U.S. PATENT DOCUMENTS 4,881,414 A 11/1989 Setaka et al.
6,161,644 A * 12/2000 Kim .............................. 180/443
6,363,797 B1 * 4/2002 Tokumoto ............... 73/862.328
2002/0035877 A1 * 3/2002 Tokumoto ............... 73/862.333
2002/0124663 A1 9/2002 Tokumoto et al.

FOREIGN PATENT DOCUMENTS

| DE | 3816234 A1 | 12/1988 |
| EP | 1 300 662 A2 | 4/2003 |
| JP | 2002-29431 | 1/2002 |
| JP | 2002-116095 | 4/2002 |

OTHER PUBLICATIONS

European Search Report dated Feb. 1, 2005.

* cited by examiner

*Primary Examiner*—Max Noori
(74) *Attorney, Agent, or Firm*—McGinn & Gibb, PLLC (57) ABSTRACT

In a detecting apparatus for detecting a steering state at a steering member (1) by respectively providing targets (34 and 35) in the shape of a spur gear having teeth portions (34a and 35a) to an input shaft (32) connected to the steering member and an output shaft (33) connected to the input shaft (32) by interposing a torsion bar (31), when an allowable maximum value of rotational torque applied to the steering member is designated by notation T, a number of teeth Z of the teeth portions (34a and 35a) and a spring constant K of the torsion bar (31) are determined to satisfy the following inequality, 360(deg)/Z>T(Nm)/K(Nm/deg).

4 Claims, 4 Drawing Sheets

STEERING STATE DETECTING APPARATUS

BACKGROUND OF THE INVENTION

The present invention relates to a detecting apparatus used in a vehicle, such as an automobile, for detecting a steering state of a steering member thereof.

For example, in an automobile, generally, a steering assisting apparatus of an electric type or a hydraulic type is connected to a steering system between a steering member and a steered wheel and a steering load of a driver is alleviated by applying steering assisting force from the steering assisting apparatus to the steering system. The steering system includes a steering shaft having an input shaft connected to the steering member and an output shaft connected to the steered wheel by interposing a torsion bar between the input shaft and the output shaft and a direction of the steered wheel is changed in accordance with driver's operation for steering the steering member.

Further, in the above-described automobile, it is requested to prevent steering feeling of the driver from being deteriorated by exerting a pertinent steering assisting force in accordance with the steering operation and there is provided a steering state detecting apparatus for detecting a steering state at the steering member, specifically, steering torque applied to the member, steering angle or the like.

A general steering state detecting apparatus is provide with two sensor portions for respectively outputting output signals in accordance with rotation of the input shaft and the output shaft and the steering torque applied to the steering member is calculated by calculating a torsional angle of the torsion bar by acquiring a relative angular displacement between the input and the output shafts based on a signal phase difference of the sensor portions. Further, the sensor portions each is provided with a target in a shape of a circular ring having a teeth portion comprising projected streaks made of a magnetic body inclined to an axial direction of a corresponding one of the input and the output shafts in the same direction by an equal angle and a magnetic sensor comprising a magnetoresistive element arranged to be opposed to the teeth portion and the magnetic sensor outputs an output signal periodically changed in accordance with rotation of the corresponding one of the input and the output shafts (for example, refer to Patent Literature 1).

However, according to the above steering state detecting apparatus, the magnetic sensor detects a change in a distance to the teeth portion inclined to the axial direction by the equal angle in accordance with rotation of the corresponding one of the input and the output shafts based on a change in an intensity of a magnetic field and outputs the periodically changed output and therefore, it is necessary to attach the sensor and the target with high accuracy since an attaching allowable error between the magnetic sensor and the teeth portion is small in the axial direction and a long period of time is required for integrating operation thereof.

In order to solve the above-described problem, the applicant provides a detecting apparatus capable of increasing an attaching allowable error between a teeth portion and a magnetic sensor in an axial direction in comparison with that of the above apparatus by using a target in a shape of a spur gear having a teeth portion projected substantially at equal intervals in a peripheral direction in place of the target (for example, refer to Patent Literature 2)

Patent Literature 1
   JP-A-2002-29431

Patent Literature 2
   JP-A-2002-116095

However, according to the above steering state detecting apparatus described in Patent Literature 2, when the torsion bar is twisted by a large amount, depending on a number of teeth of the target teeth portion, output signals (rotation detecting waveforms) of input and output shafts outputted by a corresponding one of magnetic sensors may be shifted from each other by an amount of one period or more. Therefore, the relative angular displacement of the input and the output shafts cannot instantly be detected by using the rotation detecting waveforms from the respective magnetic sensors and it is necessary to carry out a determining process of whether the rotation detecting waveforms are shifted from each other by an amount of one period or more by counting numbers of waveforms (periods) of the respective rotation detecting waveforms of the input and the output shafts from a time point of starting (detecting) the steering operation of the driver. As a result, the steering state immediately after inputting power source (starting automobile) may not be able to be detected or an increase in a processing of the detecting apparatus or large-sized formation of a circuit scale may be brought about.

SUMMARY OF THE INVENTION

In view of the above-described problem, it is an object of the invention to provide a steering state detecting apparatus capable of firmly preventing rotation detecting waveforms of input and output shafts from being shifted from each other by an amount of one period or more even when a torsion bar is twisted by a large amount and therefore, capable of instantly detecting a relative angular displacement of the input and the output shafts and having a simple structure at low cost.

In order to solve the aforesaid object, the invention is characterized by having the following arrangement.

Aspect 1. A steering state detecting apparatus comprising:
   an input shaft connected to a steering member;
   an output shaft;
   a torsion bar which has a spring constant K and connects the input shaft to the output shaft;
   a first sensor portion for outputting an output signal in accordance with rotation of the input shaft which includes a target in a shape of spur gear integrally rotatable with the input shaft including first teeth projected substantially at equal intervals in a peripheral direction of the input shaft, and a magnetic sensor having a magnetoresistive element and arranged to be opposed to the first teeth; and
   a second sensor portion for outputting an output signal in accordance with rotation of the output shaft which includes a target in a shape of spur gear integrally rotatable with the output shaft including second teeth projected substantially at equal intervals in a peripheral direction of the output shaft, and a magnetic sensor having a magnetoresistive element and arranged to be opposed to the second teeth,
   wherein a steering state at the steering member is detected based on the output signals of the first and second sensor portions, and
   wherein following inequality is satisfied:

$360(\deg)/Z > T(Nm)/K(Nm/\deg)$ where T represents an allowable maximum value of a rotational torque applied to the steering member and Z represents a number of the first and second teeth.

Aspect 2. The steering state detecting apparatus according to the aspect 1, wherein a relative angular displacement between the input and output shafts is detected by comparing the output signal of the first sensor portion with the output signal of the second sensor portion without executing a, processing of determining whether the output signals are shifted from each other by an amount of one period or more.

Aspect 3. The steering state detecting apparatus according to the aspect 1, wherein an axial direction width of the first and second teeth is set to be larger than a detecting width of the magnetic sensor in an axial direction of the input and output shafts by an integration tolerance between the first and second teeth and the magnetic sensor.

Aspect 4. The steering state detecting apparatus according to the aspect 1, wherein an axial direction width of the first and second teeth is set to be larger than a detecting width of the magnetic sensor in an axial direction of the input and output shafts by 2 through 10 mm.

DETAILED DESCRIPTION OF THE PREFERRED EMBODIMENTS

An explanation will be given of a preferable embodiment showing a steering state detecting apparatus of the invention in reference to the drawings as follows. Further, in the following explanation, an explanation will be given of a case in which the invention is applied to an electric power steering apparatus as a steering assisting apparatus of an electric type.

Figure 1:
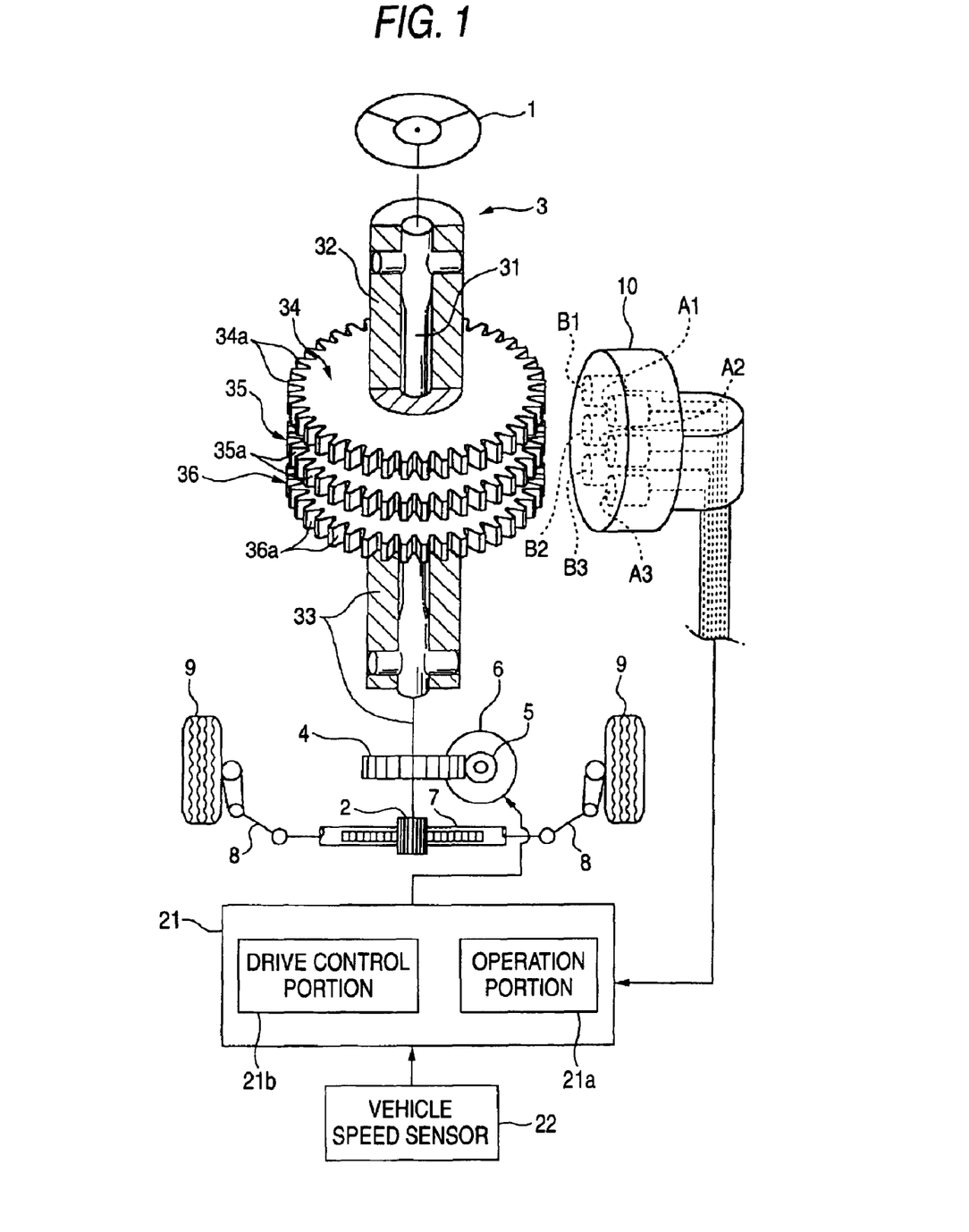
FIG. 1 is a structure view showing a constitution of an essential portion of an electric power steering apparatus constituted by including a steering state detecting apparatus according to an embodiment of the invention.

FIG. 1 is a structure view showing a structure of an essential portion of an electric power steering apparatus including a steering state detecting apparatus according to an embodiment of the invention. In the drawing, the electric power steering apparatus of the embodiment is mounted to, for example, automobile and a steering shaft 3 is interposed between a steering member (steering wheel) 1 and a pinion 2. The steering shaft 3 is provided with a torsion bar 31 provided at a center thereof, an input shaft 32 fixed to an input side (upper side) of the torsion bar 31 and an output shaft 33 fixed to an output side (lower side) of the torsion bar 31. Although the input shaft 32 and the output shaft 33 are arranged coaxially to each other, the input shaft 32 and the output shaft 33 are not directly connected to each other but are coaxially connected by interposing the torsion bar 31.

The input shaft 32 is connected with the steering member 1 and rotation of the steering member 1 by steering operation of a driver is directly transmitted thereto.

The output shaft 33 is connected with a speed reducing mechanism having a worm 5 and a worm wheel 4 in mesh therewith and an electric motor 6 for assisting steering an output shaft of which is integrally rotatably attached with the worm 5 and which is controlled by a control unit 21 and speed of rotation of the electric motor 6 is reduced and transmitted to constitute a steering assisting force. Rotation of the pinion 2 is converted into linear movement of a rack 7 to steer steered wheels 9 via left and right tie rods 8. The speed reducing mechanism and the electric motor 6 constitute a steering assisting portion for exerting the steering assisting force to the steering system from the steering member 1 to the steered wheel 9.

Further, the input shaft 32 and the output shaft 33 are provided with sensor portions included in the steering state detecting apparatus for detecting respective rotational angles of the input and the output shaft 32 and 33 rotated in accordance with the steering operation to the steering member 1. Specifically, in reference to FIG. 2, the input shaft 32 is integrally rotatably attached with a first target plate 34 and first magnetic sensors A1 and S1 are arranged on an outer side of an outer periphery of the target plate 34. Similarly, the output shaft 33 is integrally rotatably attached with second and third target plates 35 and 36 and second and third magnetic sensors A2 and B2 and A3 and B3 on outer sides of outer peripheries of the target plates 35 and 36.

Figure 2:
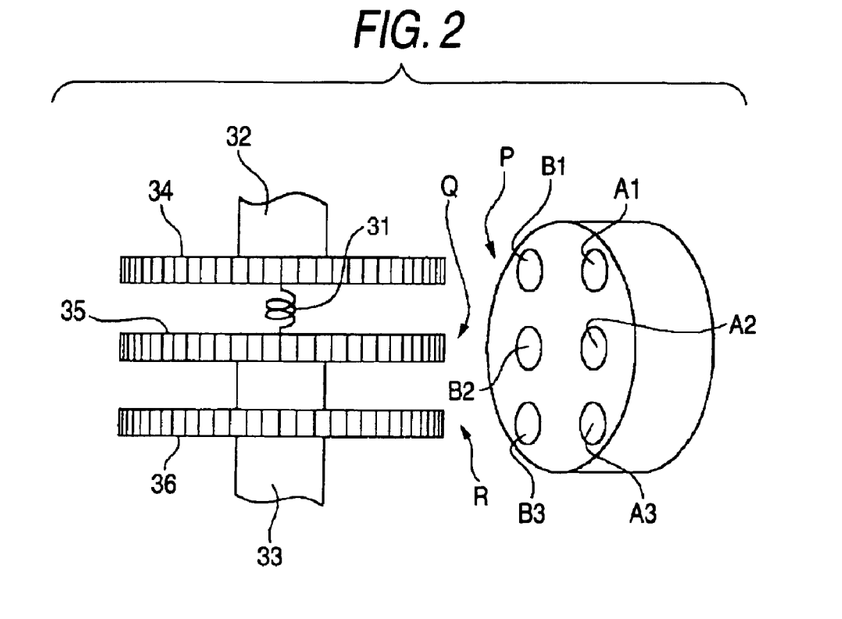
FIG. 2 is a view schematically showing a torsion bar, an input shaft, an output shaft, respective target plates and magnetic sensors in the electric power steering apparatus.

The first target plate 34 and the first magnetic sensors A1 and B1 constitute a first sensor portion P for outputting an output signal in accordance with rotation of the input shaft 32 to the control unit 21, the second target plate 35 and the second magnetic sensors A2 and B2 constitute a second sensor portion Q for outputting an output signal in accordance with rotation of the output shaft 33 to the control unit 21. Further, the third target plate 36 and the third magnetic sensors A3 and B3 constitute a third sensor portion R for outputting an output signal in accordance with rotation of the output shaft 33 to the control unit 21 and the control unit 21 detects an absolute rotational position of the output shaft 33 by using the output signals of the second and the third sensor portions Q and R.

Further, the respective target plates 34 through 36 are constituted in a shape of a spur gear provided with teeth portions 34a through 36a at outer peripheries thereof comprising magnetic bodies in a peripheral direction at equal intervals. Further, the respective target plates 34 through 36 correspond to gear products having module of 3 or smaller prescribed by JIS and mountability to the automobile is prevented from being deteriorated by preventing outer diameters thereof from increasing more than necessary while ensuring respective sensitivities of the sensor portions P, Q and R by optimizing the outer diameters (pitch circle diameters) and numbers of teeth portions (numbers of teeth) (details thereof will be described later). Further, the targets in the shape of the spur gear may be formed with recesses and projections at outer peripheries thereof and individual shapes of the teeth portions are not limited to shapes of the teeth portions 34a through 36a front end portions of which are cut off in the axial direction shown in FIG. 1.

Further, according to the first and the second target plates 34 and 35 used for detecting a relative angular displacement between the input and the output shafts 32 and 33, numbers of teeth of the teeth portions 34a and 35a are set to the same number Z (for example, 36) and output signals (rotation detecting waveforms) of the input and the output shafts 32 and 33 outputted by the corresponding sensor portions P and Q are firmly prevented from shifting from each other by an amount of one period or more as described later in details.

Further, in the third target plate 36, as a number of teeth of the teeth portion 36a, there is selected a number which is prime to the number of teeth 36 of the first and the second target plates 34 and 35 (which is not provided with a common divider other than 1), for example, 35.

Further, the first through the third magnetic sensor A1, B1, A2, B2, A3 and B3 are arranged in three stages and two rows to be opposed to the teeth portions 34a through 36a at the outer peripheries of the corresponding target plates 34 through 36 and are contained in a sensor box 10. The sensor box 10 is fixed to a predetermined position of a vehicle body to ensure to maintain gaps between the respective magnetic sensors A1, B1, A2, B2, A3 and B3 and the teeth portions 34a through 36a by a predetermined distance. Further, the first magnetic sensors A1 and B1 are arranged to be opposed to different positions of the first target plate 34 in a peripheral direction, respectively. Similarly, the second magnetic sensors A2 and B2 are arranged to be opposed to different positions of the second target plate 35 in the peripheral direction and the third magnetic sensors A3 and B4 are arranged to be opposed to different positions of the third target plate 36 in the peripheral direction, respectively.

The respective magnetic sensors A1 through A3 and B1 through B3 include elements having a characteristic of changing resistance by operation of a magnetic field, for example, magnetoresistive elements (MR elements) and output voltage signals periodically changed in accordance with recesses and projections at outer peripheries of the targets by the teeth portions 34a through 36a opposed thereto, that is, changed by one period by a single tooth portion. In details, when the first target of plate 34 is rotated along with the input shaft 32 in accordance with steering operation of the driver, output signals of the first magnetic sensors A1 and B1 become periodic signals periodically changed in accordance with a change in a rotational angle of the input shaft 32 and the target plate 34 (angular displacement) by recesses and projections. Further, when the second target plate 35 is rotated along with the output shaft 33, output signals of the second magnetic sensors A2 and B2 become periodic signals periodically changed in accordance with a change in a rotational angle of the output shaft 33 and the target plate 35 by recesses and projections and when the third target plate 36 is rotated along with the output shaft 33, output signals of the third magnetic sensors A3 and B3 become periodic signals periodically changed in accordance with a change in a rotational angle of the output shaft 33 and the target plate 36 by recesses and projections.

Figure 3:
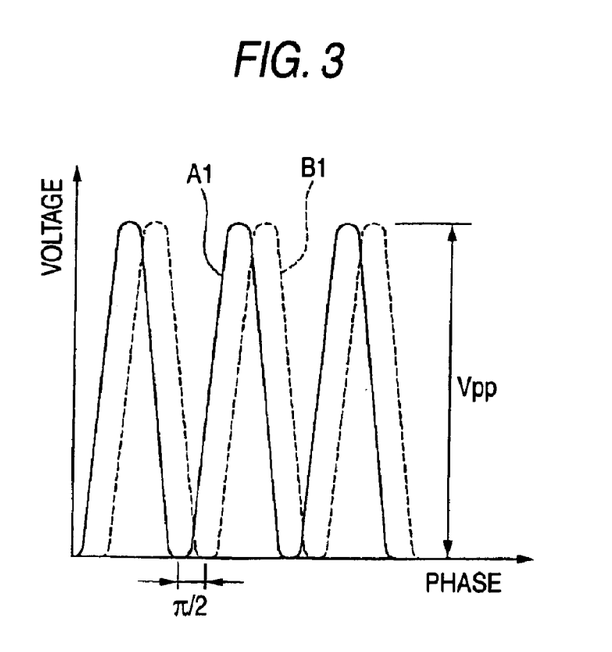
FIG. 3 is a graph showing an output signal (voltage) from the magnetic sensor.

Further, as shown by FIG. 3 the first magnetic sensors A1 and B1 are arranged to be opposed to the first target plate 34 such that a phase difference of, for example, $\pi/2$ by an electric angle is produced by the output signals. Similarly, the second magnetic sensors A2 and B2 are arranged to be opposed to the second target plate 35 such that output signals thereof produces a phase difference of $\pi/2$ and the third magnetic sensors A3 and B3 are arranged to be opposed to the third target plate 36 such that a phase difference of $\pi/2$ is produced by output signals thereof. By respectively shifting phases of the output signals from the couples of the magnetic sensors A1 through A3 and B1 through B3 in the first through the third sensor portions P, Q and R in this way, even when nonlinear changes emerge at vicinities of maximum values and minimum values of output waveforms in accordance with shape of recesses and projections of the corresponding target plates 34 through 36, when ones of signals of the couples of magnetic sensors A1 through A3 and B1 through B3 are in nonlinear regions, the control unit 21 can use signals in others of linear regions by which accuracy of detecting respective rotations of the input and the output shafts 32 and 33 can be prevented from being deteriorated.

Further, since the number of teeth of the third target plate 36 (=35) is smaller than the number of teeth of the second target plate 35 (=36) by 1, outputs of the third magnetic sensors A3 and B3 produce a phase shift of $((2\pi/36)-(2\pi/35))$ per a rotational amount of $(2\pi/36)$ of the output shaft 33 in comparison with outputs of the second magnetic sensors A2 and B2 and recover to the original state by one rotation of the output shaft 33. Therefore, by previously investigating a relationship between the absolute rotational position of the output shaft 33 and the shift of the phase to form a table, the absolute rotational position of the output shaft 33 can be determined from the phase shift. Such a table is previously stored to a data storing portion, mentioned later, of the control unit 21.

Further, at the respective sensor portions P, Q and R, the magnetic sensors A1 through A3 and B1 through B3 are respectively connected to the control unit 21 via amplifiers for amplifying signals thereof and band pass filters for removing noise of disturbance noise or the like (not illustrated).

Figure 4:
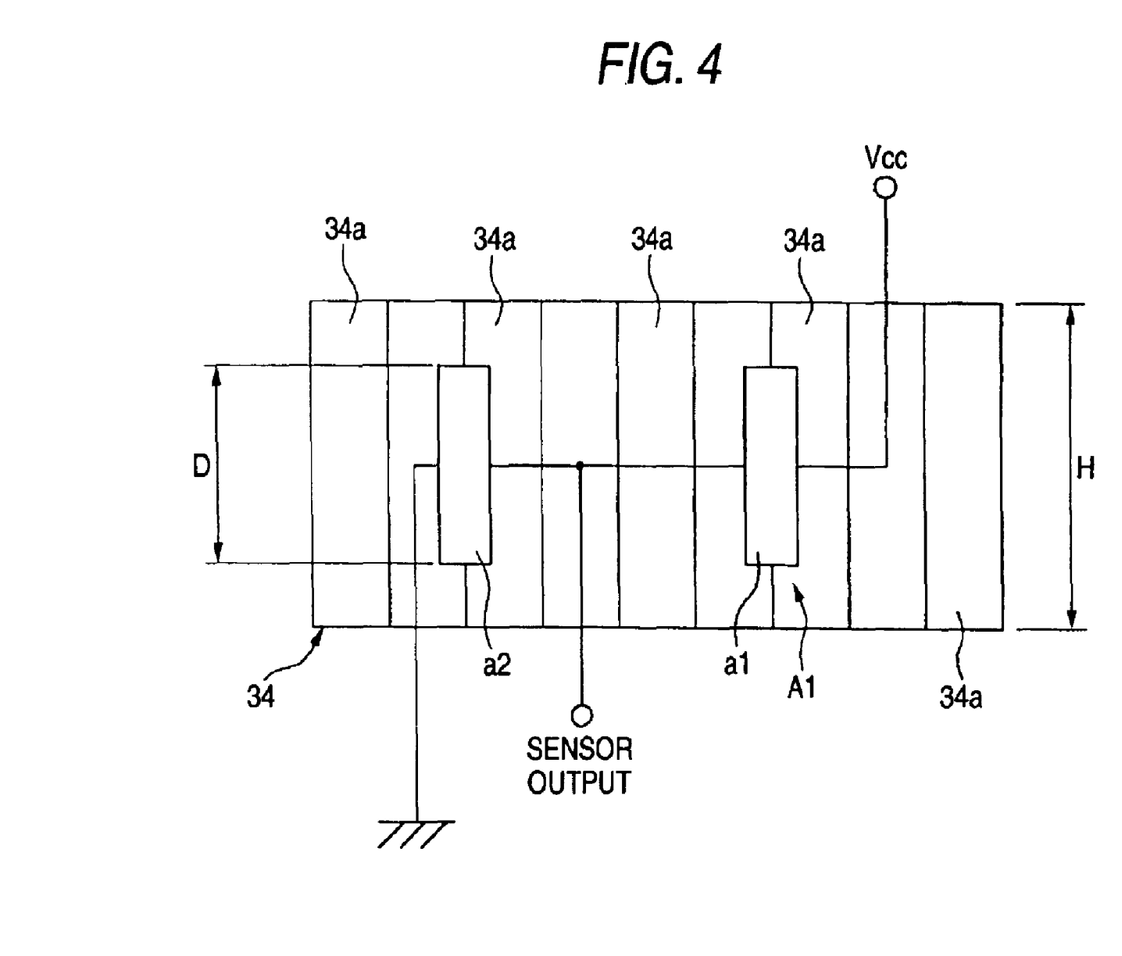
FIG. 4 is a structure view showing an example of a specific constitution of the magnetic sensor.

Further, as shown in FIG. 4, for example, the magnetic sensor A1 is arranged with two of the MR elements a1 and a2 to align in a tangential direction of the input shaft 31 (target plate 34) to connect by a half bridge circuit. That is, voltage Vcc is applied to the MR elements a1 and a2 connected to each other and a voltage value between the two MR elements a1 and a2 constitutes a sensor output. When resistances of the respective MR elements a1 and a2 are changed by rotation of the target plate 34, the voltage value between the two MR elements A1 and A2 is periodically changed to provide an output in a shape of a sine wave. Further, the other magnetic sensors A2 through A3 and B1 through B3 are constituted similar to the sensor A1 shown in FIG. 4.

Further, according to the respective sensor portions P, Q and R, as exemplified in FIG. 4, an axial direction width of the teeth portion 34a of the target plate 34 (designated by notation H in the drawing) is made to be larger than each detecting width in the axial direction of the MR elements a1 and a2 (designated by notation D in the drawing), The detecting width is not an axial direction dimension at a surface of the element opposed to the teeth portion 34a but a sensible axial direction width of the element prescribed by the axial direction dimension, an air gap between the teeth portions 34a and the element and an intensity of a magnetic field of a electromagnet for generating a magnetic field provided on the side of the sensor.

Specifically, the axial direction width of the teeth portion 34a is set to be larger than the detecting width by an integration tolerance between the teeth-portion 34a and the magnetic sensor A1 (for example, ±1 mm), preferably, 2 through 10 mm. By making the axial direction width of the target teeth portion 34a larger than the detecting width of the magnetic sensor A1 in this way, the attaching allowable error between the magnetic sensor A1 and the teeth portion 34a in the axial direction can be increased and operation of attaching the magnetic sensor A1 and the target plate 34 separately attached to the automobile and operation of integrating the steering state detecting apparatus can simply be carried out. Further, by limiting the integration tolerance to be equal to or smaller than 10 mm, the sensor portion P, that is, the detecting apparatus can easily be integrated to the automobile by preventing the axial direction dimension of the target plate 34 from increasing more than necessary.

The control unit 21 is provided with an operation portion 21a for carrying out predetermined operation by using outputs of the first through the third sensor portions P, Q and R and a drive control portion 21b for controlling to drive the electric motor 6 based on a result of operation of the operation portion 21a. The control unit 21 is inputted with a signal of vehicle speed detected by a vehicle speed sensor 22 and determines rotational force produced by the electric motor 6 in view of running speed of the automobile. Further, the control unit 21 is provided with a data storing portion (not illustrated) constituted by an involatile memory or the like and the data storing portion is previously stored with programs and information or the like formed into a table necessary for controlling to drive the electric motor 6 and is pertinently stored with results of operations of respective portions of the unit 21 and information indicating a running state of the automobile from the vehicle speed sensor 22 or the like.

The operation portion 21a acquires outputs of, for example, the sensor portions P and Q at a predetermined sampling period, acquires rotational angles of the corresponding input shaft 32 and output shaft 33 and thereafter calculates the absolute value of the angular displacement between the input and the output shafts 34 and 33 by comparing the rotational angles (calculating phase difference) to thereby calculate the steering torque and the steering angle applied to the steering member 1. Further, the operation portion 21a determines an instruction value to the electric motor 6 based on the calculated steering torque and steering angle to instruct to the drive control portion 21b. Further, the operation portion 21a can also calculate the steering torque and the steering angle by calculating the absolute value of the absolute angular displacement of the output shaft 33 by using the output of the third sensor portion R. Further, the operation portion 21a can also calculate steering (rotational) speed of the steering member 1 and steering acceleration thereof as the steering state of the steering member 1.

The drive control portion 21b drives the electric motor 6 by supplying current to the electric motor 6 based on the instruction value instructed from the operation portion 21a. Thereby, the electric power steering apparatus of the embodiment can detect the steering operation of the driver and exert the steering assisting force in accordance with the operation.

A specific explanation will be given here of optimizing a number of teeth Z of the teeth portions 34a and 35a of the target plates 34 and 35 as well as the outer diameter and the numbers of teeth of the respective target plates 34 through 36.

Figure 5:
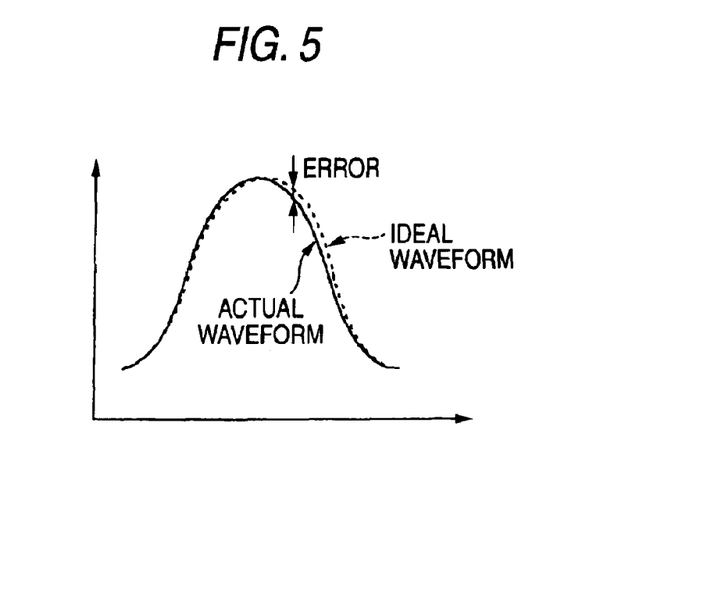
FIG. 5 is a graph exemplifying an ideal waveform and an actual waveform of the output signal of the magnetic sensor.

As shown by FIG. 5, in the rotation detecting waveform of each of the sensor portions P, Q and R may causes a detection error due to working accuracy on the side of the target plate or on the side of the magnetic sensor or a variation in the air gap and an actual rotation detecting waveform is slightly distorted as shown by a bold line in the drawing in contrast to an ideal waveform shown by a dotted line in the drawing. With regard to such a distortion, when the working accuracies on the side of the target plate and the side of the magnetic sensor are the same, by increasing the number of teeth of the target teeth portion, detection accuracy of the respective rotational angles of the input and the output shafts 32 and 33 can be promoted thereby enhancing a detection accuracy of the steering torque. However, when the number of teeth is excessively increased, in the case in which the torsion bar 31 is twisted by a large amount, a shift between the rotation detecting waveforms of the input and the output shafts 32 and 33 may be produced by an amount of one period or more by outputting the rotation detecting waveforms of the input shaft 32 more than the rotation detecting waveforms of the output shaft 33 by the amount of one period or more or conversely outputting the rotation detecting waveforms of the output shaft 33 less than the rotation detection waveforms of the input shaft 32 by the amount of one period or more. Further, with an increase in the number of teeth, the target plate is also enlarged to bring about large-sized formation of the steering state detecting apparatus, mountability of the detecting apparatus to the automobile is deteriorated and an amount of absorption set to the steering shaft 3 in order to absorb impact in collision needs to shorten.

Figure 6:
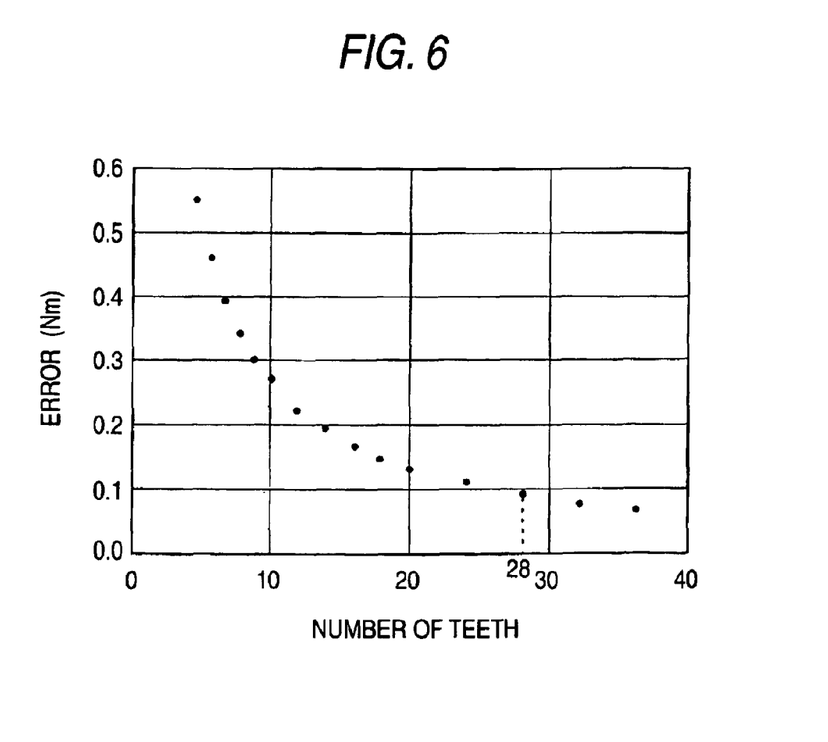
FIG. 6 is a graph showing an example of a result of measuring an error produced in steering torque in a verifying test of changing a number of teeth of the target plate shows in FIG. 1.

Therefore, the inventors of the application calculate an error in the steering torque calculated by the operation portion 21a by using target plates having the same outer diameter and variously changing numbers of teeth of the teeth portions. As shown by FIG. 6 which is an example of a result of the verifying test, it has been found that in order to make an allowable error of the steering torque requested when applied to the electric power steering apparatus to be equal to or smaller than 0.1 (Nm), the number of teeth of the target plate maybe equal to or larger than 28. Further, FIG. 6 shows a result of using target plates corresponding to gear products of module 1.

Further, according to other verifying test, it has been confirmed that a desired sensing sensitivity can be ensured by promoting an S/N ratio and a signal amplitude (Vpp) of the output signal of the corresponding magnetic sensor by constituting a pertinent shape of a size of each of the teeth portions 34a through 36a by making the outer diameter equal to or larger than 30 mm and constituting the number of teeth by 28 teeth or more, further preferably, 32 teeth through 40 teeth. Further, it has been verified that by restricting the module and the number of teeth respectively to 3 and 40 or smaller, attachment to the automobile can be simplified by constituting a compact sensor portion the target outer diameter of which is limited to be equal to or smaller than 120 mm (=3×40).

Further, when the outer diameter is made to be smaller than 30 mm or when teeth portions exceeding 40 teeth are formed, detection accuracy of rotational angle or the like using the output signal of the sensor portion is deteriorated by deteriorating the S/N ratio caused by reducing the shape of the teeth portion or reducing the signal amplitude.

Further, according to the first and the second target plates 34 and 35, the rotation detecting waveforms of the input and the output shafts 32 and 33 are constituted to firmly prevent from being shifted from each other by the amount of one period or more by satisfying an inequality of Equation (1), shown below, prescribed by the number of teeth Z of the teeth portions 34a and 35a, an allowable maximum value T (Nm) of the rotational torque applied to the steering member 1 and a spring constant K (Nm/deg) of the torsion bar 31.

Equation 1

$$360(\deg)/Z > T(Nm)/K(Nm/\deg) \tag{1}$$

In details, in Equation (1), a maximum allowable torsional angle at the torsion bar 31 referred to as a mechanical stopper angle in the steering system is calculated by the right hand side of the equation and a center angle per a single one of the teeth portions 34a and 35a relative to an axial center of a corresponding one of the input and the output shafts 32 and 33 is calculated by the left hand side of the equation. Further specifically, the allowable maximum value T applied to the steering member 1 is about 20 (Nm), the spring constant K of the torsion bar 31 comprising spring steel is about 2.35 (Nm/deg) and the number of teeth Z of the teeth portions 34a and 35a is selected to be, for example, 36 (<42.3=(360/20)×2.35), mentioned above, satisfying Equation (1). In this way, the center angle (10°=360/36) of the single one of the teeth portions 34a and 35a is made to be larger than the maximum allowable torsional angle (8.5°= 20/2.35) As a result, even when the input and the output shafts 32 and 33 are rotated by maximally twisting the torsion bar 31 to substantially maximize the shift angle produced between the output shafts 32 and 33, it can firmly be prevented that the rotation detecting waveforms of the input shaft 32 are outputted more than the rotation detecting waveforms of the output shaft 33 by the amount of one period or more or the rotation detecting waveforms of the output shaft 33 are outputted less than the rotation detecting waveforms of the input shaft 32 by the one period or more and the rotation detecting waveforms can firmly be prevented from being shifted from each other by the amount of one period or more.

As described above, in the electric power steering apparatus according to the embodiment, even when the input and the output shafts 32 and 33 are rotated by maximally twisting the torsion bar 31, the rotation detecting waveforms of the input and the output shafts 32 and 33 can firmly be prevented from being shifted from each other by the amount of one period or more and therefore, the relative angular displacement between the input and the output shafts 32 and 33 can instantly be detected by comparing the rotation detecting waveforms at a current time point outputted from the corresponding sensor portions P and Q. Thereby, different from the above-described prior art example, the processing of determining whether the rotation detecting waveforms are shifted from each other by the amount of one period or more can be omitted. Further, since the determining processing can be omitted in this way, even immediately after inputting the power source to the control unit 21 (starting the automobile), the steering state of the steering member 1 can be detected and an increase in the processing load of the control unit 21 and large-sized formation of the circuit scale can be prevented.

Further, although according to the above-described explanation, an explanation has been given of a case of applying to the electric power steering apparatus having the steering assisting portion for exerting the steering assisting force to the steering system by the speed reducing mechanism and the electric motor 6, the invention is applicable to various detecting apparatus for detecting the steering state of the steering member of the vehicle and is applicable also to a steering assisting apparatus of other style of a hydraulic type power steering apparatus or the like for controlling a hydraulic valve based on the steering torque or a vehicle which is not mounted with a steering assisting apparatus.

Further, although in the above-described explanation, an explanation has been given of a case of using the torsion bar 31 comprising spring steel having the spring constant K of about 2.35, the invention is not limited thereto but the torsion bar may be able to firmly prevent the output signals (rotation detecting waveforms) outputted from the respective sensor portions P and Q from being shifted from each other by the amount of one period or more by determining values of respective parameters of the number of teeth Z and the spring constant K to satisfy Equation (1) when the allowable maximum value T of the rotational torque applied to the steering member 1 is designated.

Further, although in the above-described explanation, an explanation has been given of a constitution of acquiring the relative angular displacement between the input and the output shafts 32 and 33 by calculating the difference of the rotational angles of the input and the output shafts 32 and 33 by the operation portion 21a of the control unit 21, the invention is not limited thereto but there may be constructed a constitution of connecting the sensor portions P and Q to a differential amplifier and acquiring the relative angular displacement between the input and the output shafts 32 and 33 from an output signal of the differential amplifier.

The invention constituted as described above achieves the following effects.

According to the steering state detecting apparatus, even when the torsion bar is twisted by a large amount, the rotation detecting waveforms of the input and the output shafts can firmly be prevented from being shifted from each other by an amount of one period or more and therefore, the relative angular displacement of the input and the output shafts can instantly be detected by using the rotation detecting waveforms at the current time point outputted from the respective sensor portions. Therefore, a processing of determining whether the rotation detecting waveforms are shifted from each other by an amount of one period or more can be omitted and therefore, the detecting apparatus can detect the steering state at the steering member even immediately after inputting a power source thereof and an increase in a processing load of the detecting apparatus and large-sized formation of a circuit scale can be prevented. As a result, the steering state detecting apparatus having a simple structure can be provided at low cost.

Further, according to the steering state detecting apparatus, the respective sensor portions can output the rotation detecting waveforms of the corresponding input and output shafts by excluding the influence of integration error of the teeth portion and the magnetic sensor and therefore, the detecting apparatus can accurately detect the steering torque or the like without being influenced by the integration error.

Further, the axial direction width of the target can be prevented from increasing more than necessary and therefore, the sensor portion can compactly be constituted and mountability of the sensor portion and therefore the detecting apparatus to the vehicle can be prevented from being deteriorated.

What is claimed is:

1. A steering state detecting apparatus comprising:
an input shaft connected to a steering member;
an output shaft;
a torsion bar which has a spring constant K and connects the input shaft to the output shaft;
a first sensor portion for outputting an output signal in accordance with rotation of the input shaft which includes a target in a shape of spur gear integrally rotatable with the input shaft including first teeth projected substantially at equal intervals in a peripheral direction of the input shaft, and a magnetic sensor having a magnetoresistive element and arranged to be opposed to the first teeth; and
a second sensor portion for outputting an output signal in accordance with rotation of the output shaft which includes a target in a shape of spur gear integrally rotatable with the output shaft including second teeth projected substantially at equal intervals in a peripheral direction of the output shaft, and a magnetic sensor having a magnetoresistive element and arranged to be opposed to the second teeth;
wherein a steering state at the steering member is detected based on the output signals of the first and second sensor portions, and wherein following inequality is satisfied:

$$360(\deg)/Z > T(Nm)/K(Nm/\deg)$$

wherein T represents an allowable maximum value of a rotational torque applied to the steering member and Z represents a number of the first and second teeth.

2. The steering state detecting apparatus according to claim 1, wherein a relative angular displacement between the input and output shafts is detected by comparing the output signal of the first sensor portion with the output signal of the second sensor portion without executing a processing of determining whether the output signals are shifted from each other by an amount of one period or more.

3. The steering state detecting apparatus according to claim 1, wherein an axial direction width of the first and second teeth is set to be larger than a detecting width of the magnetic sensor in an axial direction of the input and output shafts by an integration tolerance between the first and second teeth and the magnetic sensor.

4. The steering state detecting apparatus according to claim 1, wherein an axial direction width of the first and second teeth is set to be larger than a detecting width of the magnetic sensor in an axial direction of the input and output shafts by 2 through 10 mm.

* * * * *